(12) United States Patent
Hennings (10) Patent No.: US 9,617,671 B1
(45) Date of Patent: Apr. 11, 2017

(54) END GUIDE FOR CORD ATTACHMENT DEVICE

(71) Applicant: THE UNITED STATES OF AMERICA AS REPRESENTED BY THE SECRETARY OF THE NAVY, Washington, DC (US)

(72) Inventor: Elsa Johnson Hennings, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 34 days.

(21) Appl. No.: 14/920,435

(22) Filed: Oct. 22, 2015

Related U.S. Application Data (62) Division of application No. 14/172,211, filed on Feb. 4, 2014, now Pat. No. 9,212,520.

(60) Provisional application No. 61/869,796, filed on Aug. 26, 2013.

(51) Int. Cl.
*D05B 23/00* (2006.01)
*B64D 17/02* (2006.01)

(52) U.S. Cl.
CPC ............ *D05B 23/00* (2013.01); *B64D 17/02* (2013.01)

(58) Field of Classification Search
CPC .... D05B 23/00; D05B 23/004; D05B 23/006; D05B 35/02; D05B 35/06; D05B 35/062; B64D 17/00; B64D 17/02; B64D 17/025; B64D 17/10; B64D 17/22; B64D 17/24; B64D 17/26; B64D 17/28
See application file for complete search history.

(56) References Cited

U.S. PATENT DOCUMENTS

| | | | | |
|---|---|---|---|---|
| 1,849,965 A | * | 3/1932 | Switlik | B64D 17/00 244/103 R |
| 2,124,650 A | * | 7/1938 | Chessler | D06J 1/00 112/427 |
| 2,464,719 A | * | 3/1949 | Quilter | B64D 17/30 244/151 R |
| 2,508,754 A | * | 5/1950 | Frieder | B64D 17/52 229/239 |

(Continued)

*Primary Examiner* — Ismael Izaguirre
(74) *Attorney, Agent, or Firm* — James M. Saunders (57) ABSTRACT

An end guide for a cord attachment device includes a cloth. The cloth is configured to fold over, unto, and overlap itself. The cloth has three portions. The first and second portions are longer than a third portion. The cloth is folded axially about a central longitudinal axis. The central longitudinal axis spans from the proximal end to the distal end of the cloth. The folding causes the first and second portions to overlap. A plurality of flutes are configured in the cloth by a plurality of stitch lines running parallel to each other and extending through first and second sides (the front and back) of the cloth and extending through the overlap of the first and second portions. At least one of the plurality of stitch lines are located between each of the flutes. The flutes span to both the proximal and distal ends of the cloth. First and second portions are folded outwardly away from the plurality of flutes at both the proximal and distal ends and then stitched to the cloth so as to create end channels for the routing of a cover cord (when a cover is used) or a keeper cord. The stitching is perpendicular to the plurality of stitch lines.

5 Claims, 9 Drawing Sheets

(56) References Cited

U.S. PATENT DOCUMENTS

| | | | | |
|---|---|---|---|---|
| 3,285,546 | A | * | 11/1966 | Jalbert .................. B64C 31/036 244/145 |
| 3,507,467 | A | * | 4/1970 | Sepp ...................... B64D 17/52 244/145 |
| 4,529,153 | A | * | 7/1985 | Conn ........................ B64B 1/58 244/126 |
| 4,637,330 | A | * | 1/1987 | Shewmon ............... B63B 21/48 112/417 |
| 2009/0127396 | A1 | * | 5/2009 | Jordan .............. A62B 35/0018 244/151 R |

* cited by examiner

END GUIDE FOR CORD ATTACHMENT DEVICE

CROSS-REFERENCE TO RELATED APPLICATIONS

This is a divisional application, claiming the benefit of both parent non-provisional application Ser. No. 14/172,211 filed on Feb. 4, 2014 and parent provisional application No. 61/869,796 filed on Aug. 26, 2013, whereby the entire disclosures of which are incorporated herein by reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to end guides and, more particularly, to end guides for cord attachment devices in parachutes and other weight-critical applications.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

Embodiments of the invention generally relate to end guides and, more particularly, to end guides for cord attachment devices in parachutes and other weight-critical applications. More particularly, the embodiments of the invention allow multiple turns of cord to be utilized as a structural attachment. Embodiments are constructed for use where weight and volume must be minimized, such as on aircraft, spacecraft, and racing watercraft. It can also be used in a marine environment where metal fittings would not be appropriate.

Embodiments of the invention are sometimes referred to as an end guide for a cord attachment device, an end guide, or even more simply as a guide, device, apparatus, system, or embodiments throughout. Embodiments of the invention also include a method of assembling and using the apparatus.

Embodiments of the invention are directed to a lightweight device that ensures that the cord can equalize the load across all its turns while not bearing on itself under load, thus maximizing the strength of the attachment. The end guide is a very lightweight, low friction, flexible device that allows a single cord to be muted between attach points to connect them in a highly efficient manner. It can also be used at the end of a parachute riser constructed of suspension lines to maximize load sharing, line attachment organization, and riser efficiency. To minimize weight, the device is constructed so as to be used with very lightweight, high strength cord, which has a very low elongation rate. When multiple turns of low elongation cord are used for attachment purposes, the cord segments are positioned such that the lengths are almost identical, as the applied load cannot equalize well between segments prior to the shortest reaching the limit of its extension and breaking before the longest can share the load. In addition, the cord can cross over itself at the end, and this bearing load of one segment on another both prevents the cord from equalizing the load as well as crushing the top layers of the cord.

Embodiments of the invention allow a cord or cords to be routed through individual channels, or flutes, in a lightweight, low friction textile guide such that the cord or cords cannot cross each other at the load bearing surface and allows each segment of the cord or cords to equalize in length quickly to prevent premature failure.

Grooved metallic or plastic spools have been used for this purpose previously. However, this solution is not adequate because low elongation cord can be damaged by riding over the groove divider, unless the divider is radiused, which adds length to the spool and weight to the attachment system. In addition, as the cord segments must all angle slightly and cross over at some point, the groove dividers tend to come in contact with the cord, which damages it and lowers the efficiency of the system.

By using a low friction textile guide, the cord is allowed to move at the required angle and there are no rigid dividers to contact the cord. In addition, the cord is prevented from migrating out of the grooves as it is fully contained by the guide at the ends. This also allows for easy assembly of the attachment system as lining up the cord segments is not required.

The flutes provide minimal clearance to attachment cords (parachute lines) and have minimal friction which prevents cord migration. Cord migration, if it occurs, lowers the tensile strength of attachment cords (parachute lines). The embodiments cause loads to equalize across all the flutes because individual attachment cords (parachute lines) can slide. "Attachment cords" are called by a variety of names including, but not limited to "attachment cording," "attachment line," "suspension line," and "extensions."

Embodiments of the invention use synthetic materials. A person having ordinary skill in the art will recognize that Kevlar® is a registered trademark for a para-aramid synthetic fiber, related to other aramids including Nomex® and Technora®. Developed at DuPont in 1965, this high strength material was first commercially used in the early 1970s as a replacement for steel in racing tires. Typically, it is spun into ropes or fabric sheets that can be used as such or as an ingredient in composite material components. Kevlar® has many applications, ranging from bicycle tires and racing sails to body armor because of its high tensile strength-to-weight ratio. By this measure it is five times stronger than steel on an equal weight basis.

Likewise, a person having ordinary skill in the art will recognize that Spectra® cloth is an ultrahigh molecular weight polyethylene, sometimes abbreviated as UHMWPE. It is sometimes referred to as high-performance polyethylene (HPPE) or high-modulus polyethylene (HMPE). UHMWPE has a very low coefficient of friction and highly resistant to abrasion, in some forms being as much as 15 times more resistant to abrasion than carbon steel. UHMWPE has a coefficient of friction comparable to polytetrafluoroethylene (PTFE), which is discussed below.

Similarly, a person having ordinary skill in the art will recognize that a polytetrafluoroethylene (PTFE) is a synthetic fluoropolymer of tetrafluoroethylene having numerous applications. PTFE is well known by the DuPont brand name Teflon®. PTFE is a fluorocarbon solid, as it is a high-molecular-weight compound consisting wholly of carbon and fluorine. PTFE is hydrophobic; neither water nor water-containing substances wet PTFE, as fluorocarbons demonstrate mitigated London dispersion forces due to the high electronegativity of fluorine. PTFE has one of the lowest coefficients of friction against any solid. PTFE has a coefficient of friction of about 0.05 to about 0.10.

Although embodiments of the invention are described in considerable detail, including references to certain versions thereof, other versions are possible. Examples of other versions include performing alternate combinations and sequencing of the materials to optimize performance based on specific operating environments. Therefore, the spirit and scope of the appended claims should not be limited to the description of versions included herein.

Figure 1A:
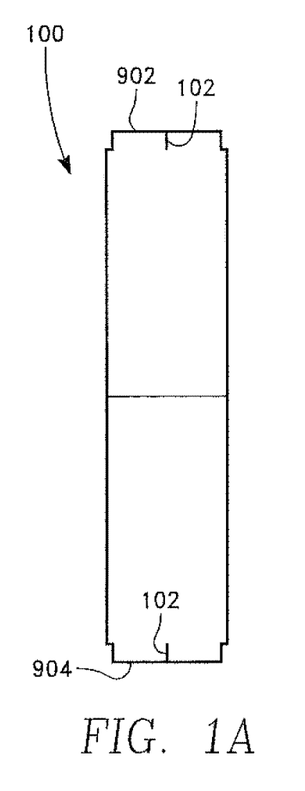
FIG. 1A is a plan view of a cover pattern for a cord attachment device, according to some embodiments of the invention.
Figure 1B:
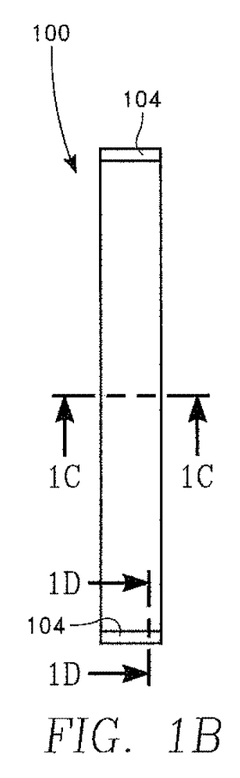
FIG. 1B is a finished view of the cover in FIG. 1A, showing cut planes 1C-1C (section 1C-1C is depicted in FIG. 1C) and 1D-1D (section 1D-1D is depicted in FIG. 1D), according to some embodiments of the invention.

In the accompanying drawings, like reference numbers indicate like elements. FIG. 1A illustrates a plan view of a concentric cover pattern for a cord attachment device. Reference character 100 depicts the concentric cover. The concentric cover 100 may also be referred to at times as simply "a cover," "the cover," or other similar variations. The concentric cover 100 is constructed out of UHMWPE. Seared cuts 102 are located at each end of the concentric cover 100. The seared cuts 102 are used to allow the cover/end guide attachment cord (804 in FIG. 8) to be routed through the cover loops 104 (see FIG. 1B), formed when the concentric cover 100 is folded and sewn (see FIG. 1D). FIG. 1B is a finished view of the cover 100 in FIG. 1A, showing cut planes 1C-1C (section 1C-C is depicted in FIG. 1C) and 1D-1D (section 1D-1D is depicted in FIG. 1D), according to some embodiments of the invention. The cover loops 104 are used to attach the concentric cover 100 to an end guide.

Some figures presented are section views associated with some embodiments of the invention. In particular, FIGS. 1C, 1D, 3B, 4B, 5B, 6B, and 7B depict sections to assist with understanding certain embodiments of the invention. For simplicity of viewing, section hatching is not presented in the section views. Various stitching is used in embodiments of the invention. Unless otherwise noted, the stitching is depicted with reference character 112 (and other reference characters such as 312, 704, and 706) throughout and is Kevlar® size E thread (type 301 stitching, having about 7 to 11 stitches per inch). Additionally, unless otherwise noted, stitching in the apparatus is an adherence mechanism and, as such, glue, tape, or staples may also be used. In most instances stitching is shown with curved dashed lines.

Figure 1C:
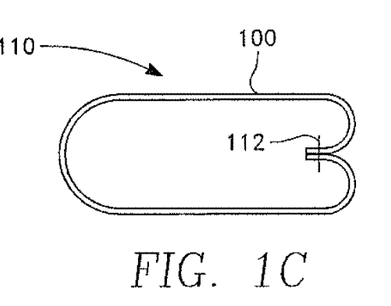
FIG. 1C is a section view perpendicular to cut plane 1C-1C of FIG. 1B, according to some embodiments of the invention.
Figure 1D:
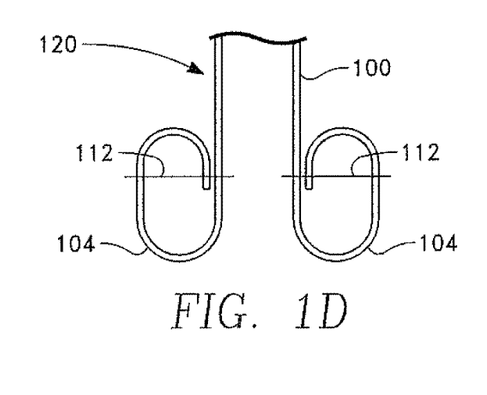
FIG. 1D is a section view perpendicular to cut plane 1D-1D of FIG. 1B, according to some embodiments of the invention.

The section views associated with section lines 1C-1C and 1D-1D in FIG. 1B are shown in FIGS. 1C and 1D, respectively. FIG. 1C is a section view perpendicular to cut plane 1C-1C of FIG. 1B, according to some embodiments of the invention. Reference character 110 is used to depict the section view in FIG. 1C. In FIG. 1C, the concentric cover is shown folded and stitched with a cover stitch 112 to form a sleeve. Hence the concentric cover 100 may also be referred to as a "sleeve." Stated another way, stitch 112 in FIG. 1C closes the concentric cover 100, allowing it to envelop an object, such as a cord attachment device. Other ways of closing the concentric cover 100 may be used instead of the stitch 112 such as, for example, glue. Further discussion on end guides is presented below.

FIG. 1D is a section view perpendicular to cut plane 1D-1D of FIG. 1B, according to some embodiments of the invention. Reference character 120 depicts the section view in FIG. 1D. One can see that there are two end channels 104 in FIG. 1D, which are formed when the cover 100 is folded over at each end and the ends sewn with thread 112 (FIG. 1D) or a similar attachment method.

Apparatus Embodiments

Figure 2:
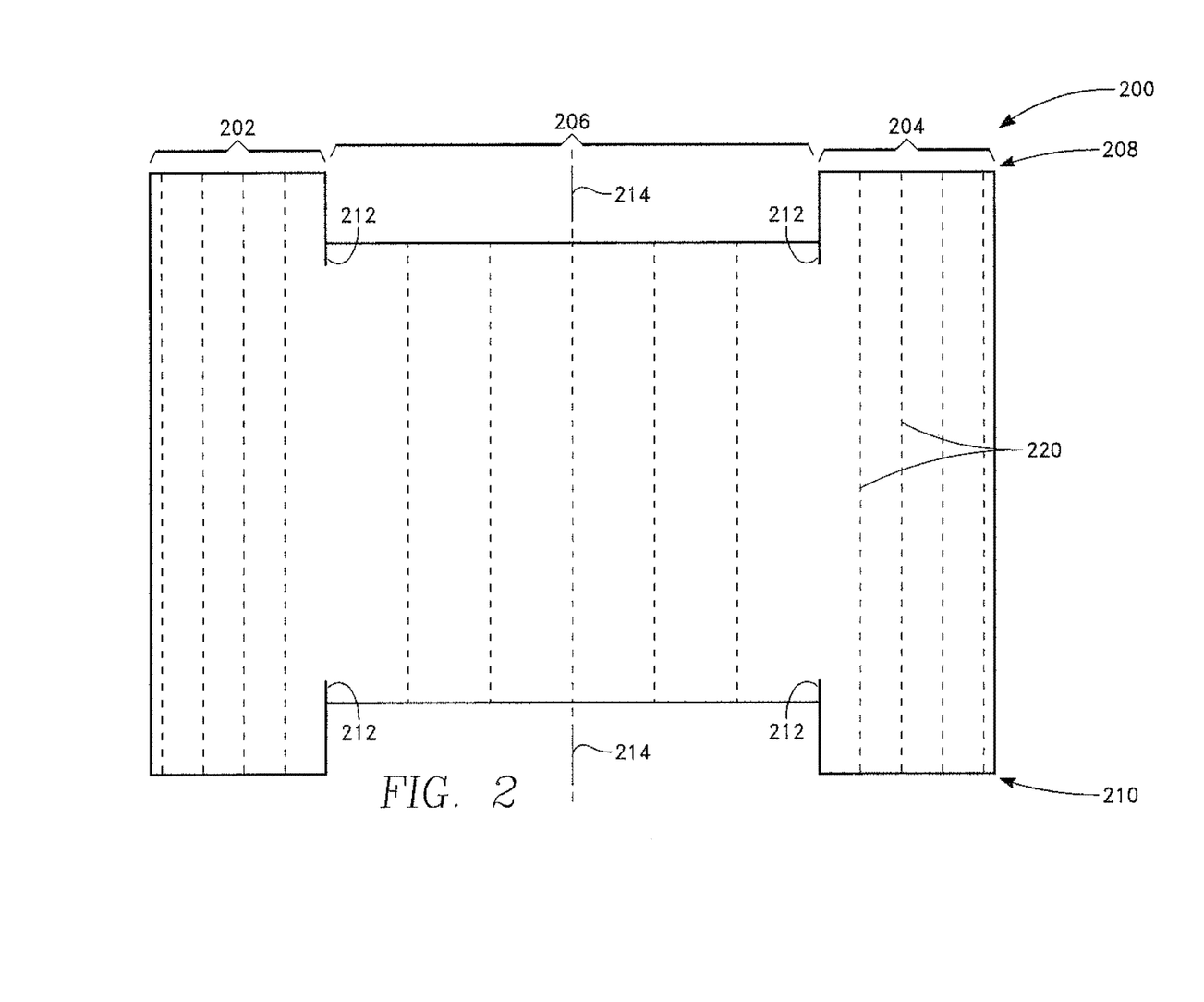
FIG. 2 is a plan view of an end guide pattern, according to some embodiments of the invention.
Figures 5A, 5B:
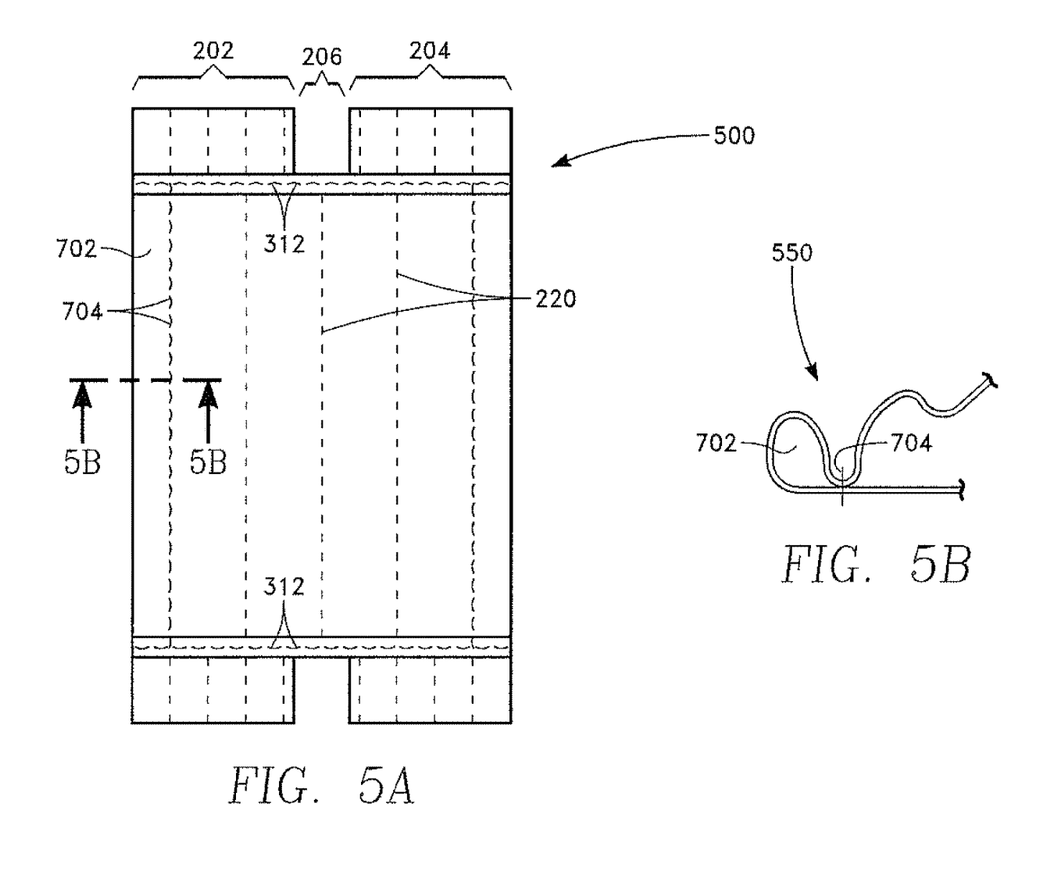
FIG. 5A is a plan view of a third assembly task for an end guide, showing cut plane 5B-5B (section 5B-5B is depicted in FIG. 5B), according to some embodiments of the invention.
FIG. 5B is a section view perpendicular to cut plane 5B-5B of FIG. 5A, according to some embodiments of the invention.
Figure 6A:
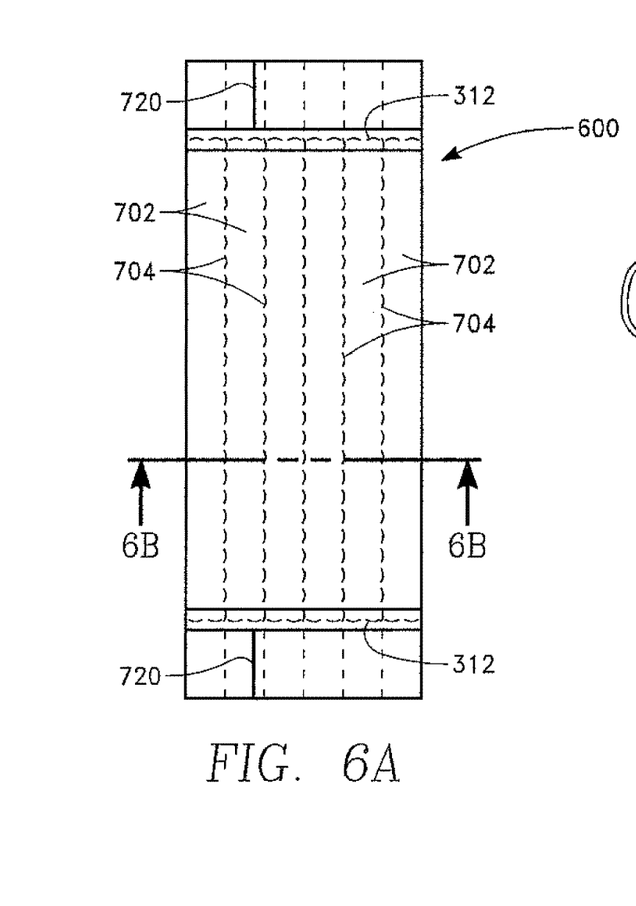
FIG. 6A is a plan view of a fourth assembly task for an end guide, showing cut plane 6B-6B (section 6B-6B is depicted in FIG. 6B), according to some embodiments of the invention.
Figure 7A:
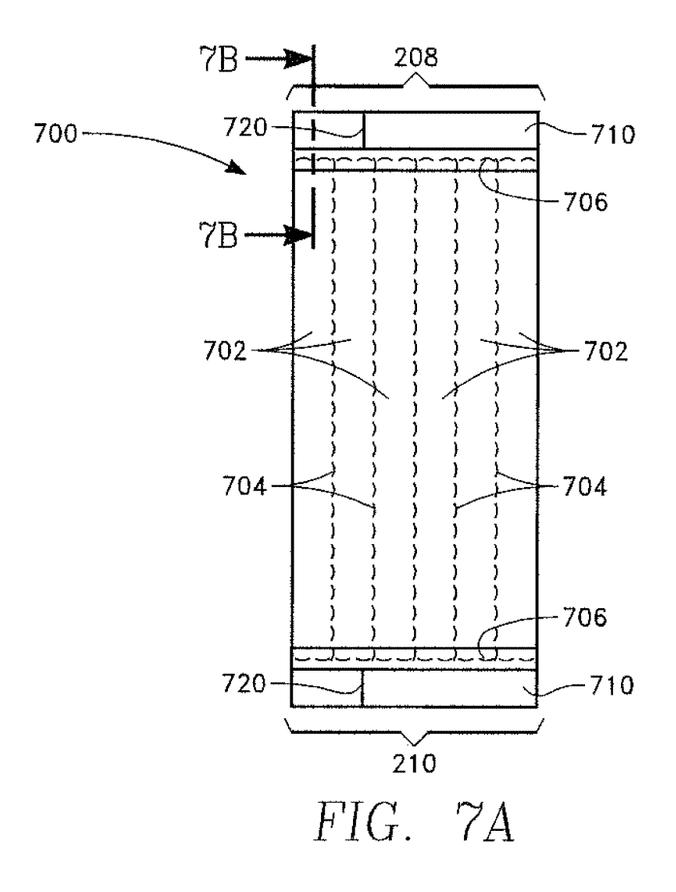
FIG. 7A is a plan view of a fifth and final assembly task for an end guide, showing cut plane 7B-7B (section 7B-7B is depicted in FIG. 7B), according to some embodiments of the invention.

FIGS. 2 through 7A illustrate an end guide in different steps of assembly, according to embodiments of the invention. In particular, FIG. 2 is a plan view of an end guide pattern, according to some embodiments of the invention. FIG. 7A is a plan view of a fifth and final assembly task for an end guide, showing cut plane 7B-7B (section 7B-7B is depicted in FIG. 7B), according to some embodiments of the invention.

FIG. 7A illustrates an assembled end guide for a cord attachment device, according to some embodiments of the invention. Reference character 700 depicts the end guide. FIG. 2 illustrates an end guide pattern in plan view, according to some embodiments of the invention. As shown in FIG. 2, the pattern is an H-shaped piece of cloth and is depicted as reference character 200. Prior to assembly, the end guide 700 is an H-shaped piece of cloth, however, the cloth may also be other shapes, including rectangular.

The cloth 200 has first and second sides (not specifically given reference characters). The first and second sides are the front and back sides of the cloth 200, respectively. As depicted on FIG. 2, the cloth 200 has three distinct sections 202, 204, and 206, completing the "H" shape. The first 202 and second 204 sections are longer than a third section 206. The first 202, second 204, and third sections 206 may also be referred to as first, second, and third portions. Similarly, the first 202 and second 204 sections may also be referred to as outer sections/zones and the third section 206 may be referred to as an inner section/zone. The dashed lines 220 depicted in FIG. 2 (as well as subsequent figures) are annotations/markings used to assist a fabricator with folding and stitch placement to form the end guide 700 (FIG. 7). The assembled end guide (700 in FIG. 7)/H-shaped cloth (200 in FIG. 2) has a proximal end 208 and a distal end 210. The H-shaped cloth 200 is configured to fold over, unto, and overlap itself.

A central longitudinal axis 214 spans from the proximal 208 to the distal ends 210 of the H-shaped cloth 200/end guide 700. The H-shaped cloth 200 is folded axially about the central longitudinal axis 214. The folding causes the first and second sections 202 & 204 (FIG. 2) to overlap. The central longitudinal axis 214 is universal with respect to its direction, running longitudinally between the proximal and distal ends 208 and 210. One having ordinary skill in the art, however, will understand that the position of the axis 214 with respect to left and right sides (when viewing FIGS. 2, 3A, 4A, 5A, and 6A) is dependent on which assembly task a fabricator is conducting. As such, the central longitudinal axis 214 is depicted only on FIG. 2 for ease of viewing.

A plurality of flutes 702 (FIG. 7A) are configured in the H-shaped cloth 200 by a plurality of first stitch lines 704. Each of the first stitch lines 704 are parallel to each other and extend through the first and second sides of the H-shaped cloth 200 and through the overlap of the first and second sections 202 & 204. At least one of the first stitch lines 704 is located between each of the flutes 702. Stated another way, at least one stitch line (continuous stitch or multiple stitches) is located between pairs of flutes 702. Thus, the first stitch lines 704 may be thought of as adherence mechanisms that form the individual flutes 704.

Alternatives to the first stitch lines 704 include, but are not limited to, glue and staples. The flutes 704 span the length of the end guide 700, from the proximal 208 to the distal ends 210. The first and second sections 202 and 204 are folded outwardly away from the plurality of flutes 704 at both the proximal 208 and distal 210 ends and then sewn 706 to the H-shaped cloth 200/end guide 700. The stitching 706 is perpendicular to the plurality of first stitch lines 704. The stitching 706 could also be referred to as second stitch lines as another way to differentiate them from the first stitch lines 704. The stitching 706 at each end of the end guide forms two end channels 710 to allow attachment of the end guide 700 to the cover with a length of cover cord 804 shown in FIG. 8.

Figure 9:
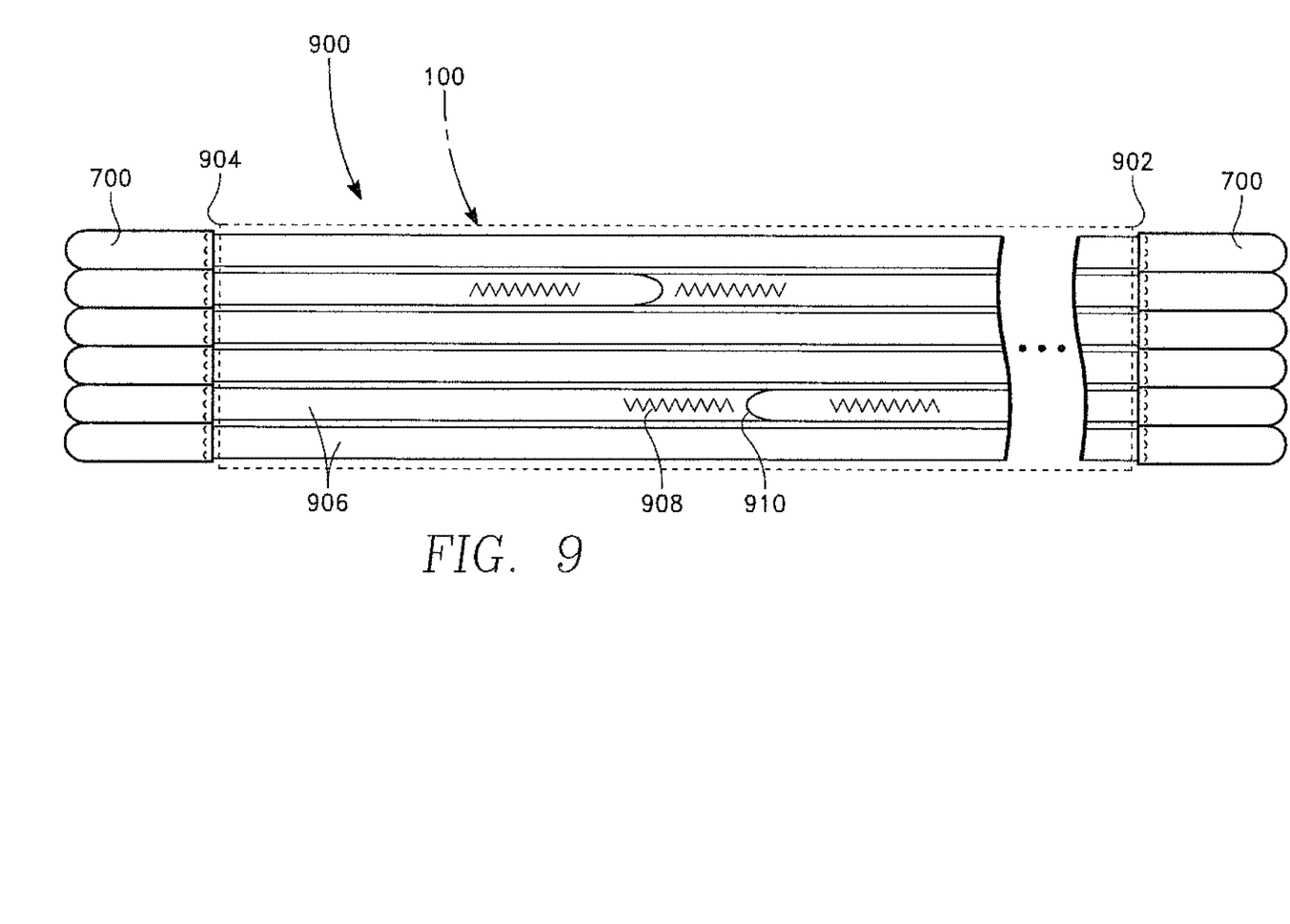
FIG. 9 is a plan view of a cord attachment device depicting a pair of end guides attached to a cover (shown with hidden lines) and attachment cords, according to some embodiments of the invention.

FIG. 9 is a plan view of a cord attachment device depicting a pair of end guides attached to a cover (shown with hidden lines) and attachment cords, according to some embodiments of the invention. The cord attachment device is depicted in FIG. 9 and referenced as reference character 900. FIG. 9 shows a plan view of the cord attachment device. The cord attachment device 900 includes a pair (two) of end guides 700. FIG. 7A depicts a singular end guide, depicted as reference character 700, and as described in detail above. A concentric cover sleeve 100 is shown in hidden lines for ease of viewing.

The concentric cover sleeve 100 has proximal and distal ends 902 and 904. The cover sleeve 100 is attached at its proximal end 902 to one of the pair of end guides 700. The cover sleeve 100 is attached at its distal end 904 to the other of the end guides 700. Reference character 906 depicts a plurality of attachment cords. Reference 908 depicts stitching, such as zigzag (type 304 or 308 stitching, 7-10 stitches per inch) commonly used to finish finger traps 910 used to join high strength low elongation cord. The pair of end guides 700 may be referred to as a first and second H-shaped cloth (H-shaped cloth is depicted as reference character 200 in FIG. 2).

Each of the H-shaped cloths 200 have first and second sides (not shown). The first and second sides are the front and back sides of the H-shaped cloths 200, respectively. As depicted on FIG. 2, the H-shaped cloths 200 have three distinct sections 202, 204, and 206, completing the "H" shape. The first 202 and second 204 sections are longer than a third section 206. The assembled end guide (700 in FIG. 7)/H-shaped cloth (200 in FIG. 2) has a proximal end 208 and a distal end 210. The H-shaped cloth 200 is configured to fold over, unto, and overlap itself.

The H-shaped cloths 200 have a central longitudinal axis 214 (FIG. 2) spanning from their proximal to distal ends 208 & 210. Each of the H-shaped cloths 200 is folded axially about the central longitudinal axis 214 (FIG. 2). The folding causes the each of the first and second sections 202 & 204 to overlap. A plurality of flutes 702 (FIG. 7A) are configured in each H-shaped cloth 200 by a plurality of first stitch lines 704.

Each of the first stitch lines 704 are parallel to each other and extend through the first and second sides of the H-shaped cloth 200 and through the overlap of the first and second sections 202 & 204. At least one of the first stitch lines 704 is located between each of the flutes 702. Stated another way, at least one stitch line (continuous stitch or multiple stitches) is located between pairs of flutes 702. Thus, the first stitch lines 704 may be thought of as adherence mechanisms that form the individual flutes 704. Alternatives to the first stitch lines 704 include, but are not limited to, glue and staples. The flutes 704 span the length of the end guide 700, from the proximal 208 to the distal ends 210. The first and second sections 202 and 204 are folded outwardly away from the plurality of flutes 704 at both the proximal 208 and distal 210 ends and then stitched 706 to the H-shaped cloth 200/end guide 700. The stitching 706 is perpendicular to the plurality of first stitch lines 704.

Figure 8:
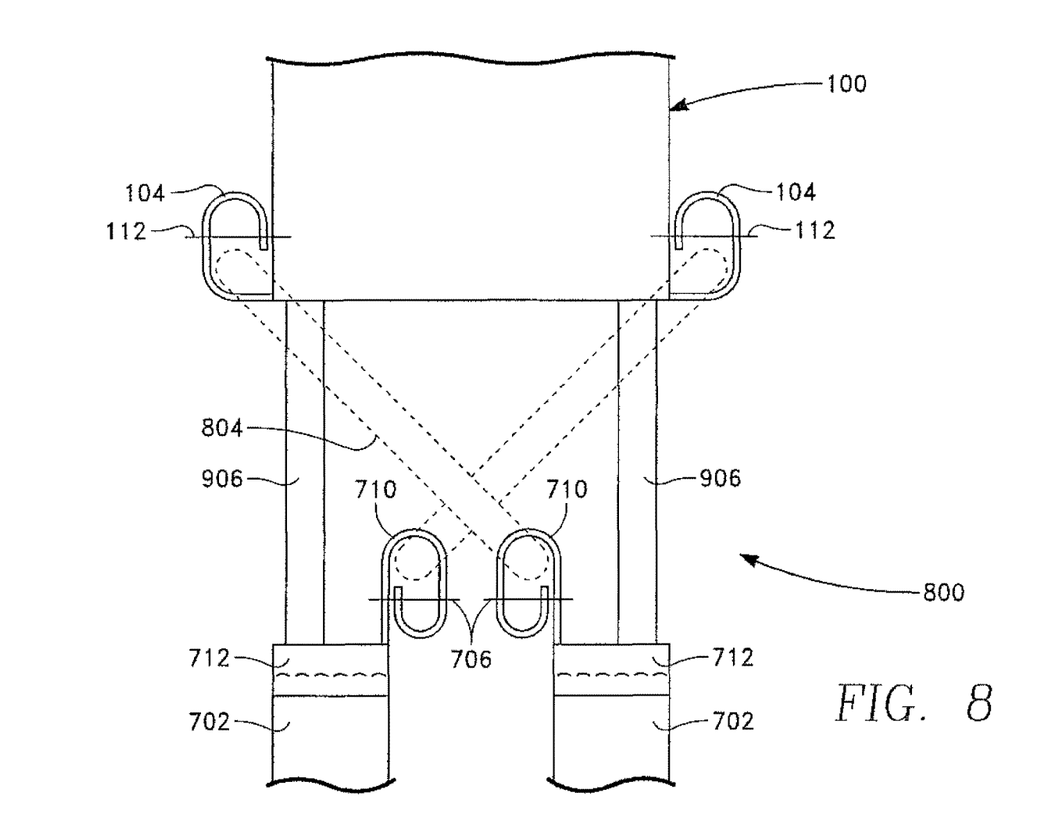
FIG. 8 is a close-up plan view depicting the attachment of a cover and an end guide, according to some embodiments of the invention.

FIG. 8 is a close-up plan view depicting the attachment of a cover and an end guide, according to some embodiments of the invention. The close-up view of one end is depicted as reference character 800. The attachment of the concentric cover sleeve 100 to each of the end guides 700 includes cover cord 804 (FIG. 8), also known as attachment cord or keeper cord, routed through the end channels 104 and 710 (FIG. 8) of the concentric cover 100 and end guide 700. The cover cord ends are tied, fingertrapped, or attached together to provide attachment of the cover and end guides. FIG. 8 shows two attachment cords 804. Although not depicted in FIG. 8, another embodiment is possible that uses only one attachment cord, which uses a figure eight pattern to connect ends of the attachment cord 804 together and through the end channels 710 and 104. Thus, the number of attachment cords 804 used is application-specific.

The concentric cover 100 is an ultrahigh molecular weight polyethylene. The concentric cover 100 is configured to concentrically envelope a plurality of loading attachment cords 906.

Assembly of Embodiments

Another embodiment of the invention relates to assembling an end guide. FIGS. 3A through 7B are assembly figures illustrating some of the procedural tasks to assemble the end guide. As discussed above, FIG. 2 depicts the H-shaped cloth 200. FIG. 7A may also be considered the completed (assembled) end guide representation. The assembly of end guides can be done individually by a person or in an automated manner, such as in a factory setting. As such, the term user or fabricator is generic below.

Figure 3A:
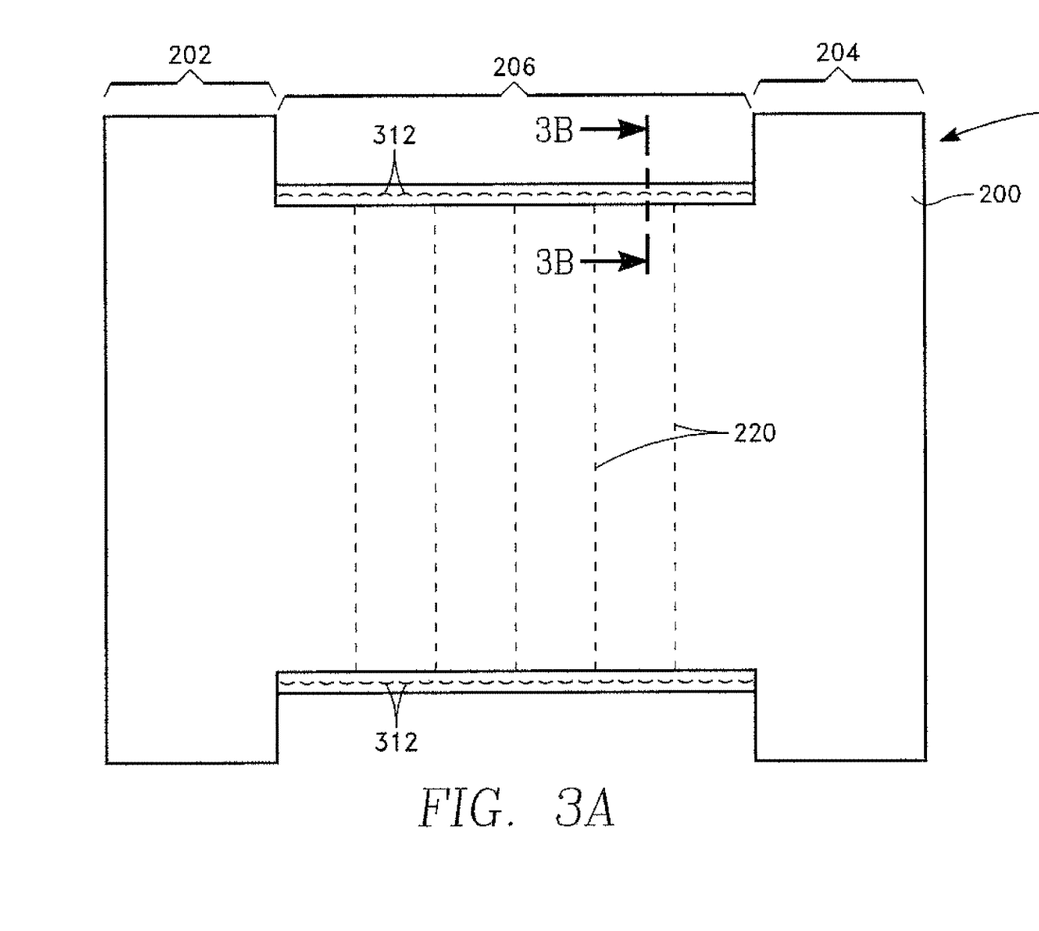
FIG. 3A is a plan view of a first assembly task for an end guide, showing cut plane 3B-3B (section 3B-3B is depicted in FIG. 3B), according to some embodiments of the invention.
Figure 3B:
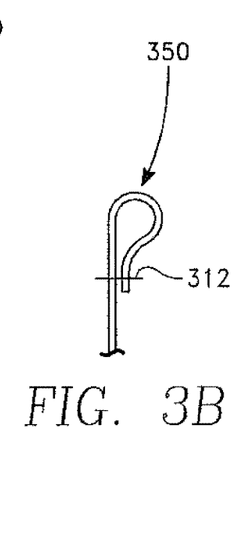
FIG. 3B is a section view perpendicular to cut plane 3B-3B of FIG. 3A, according to some embodiments of the invention.

FIG. 3A is a plan view of a first assembly task for an end guide, showing cut plane 3B-3B (section 3B-3B is depicted in FIG. 3B), according to some embodiments of the invention. The first assembly task is depicted as reference character 300. FIG. 3B is a section view perpendicular to cut plane 3B-3B of FIG. 3A, according to some embodiments of the invention, and is depicted as reference character 350. In FIG. 2, cuts 212 are made between the outer sections (202/204) and inner section 206. As shown in FIG. 3A, part of the inner section is then folded back and stitched (reference character 312). FIG. 3B shows a cross section of this area.

Figure 4A:
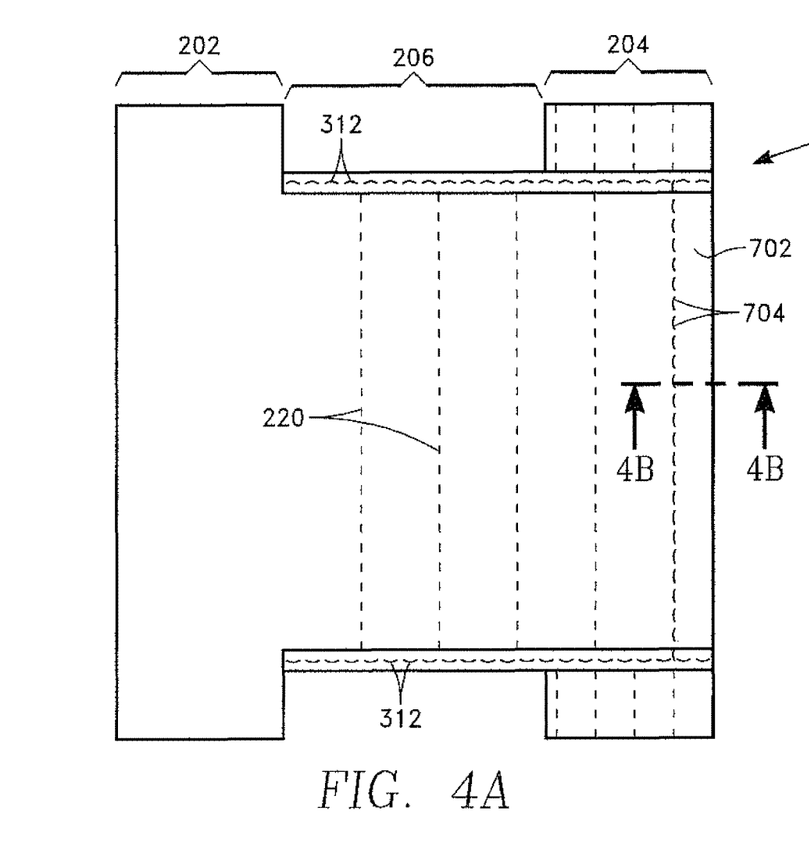
FIG. 4A is a plan view of a second assembly task for an end guide, showing cut plane 4B-4B (section 4B-4B is depicted in FIG. 4B), according to some embodiments of the invention.
Figure 4B:
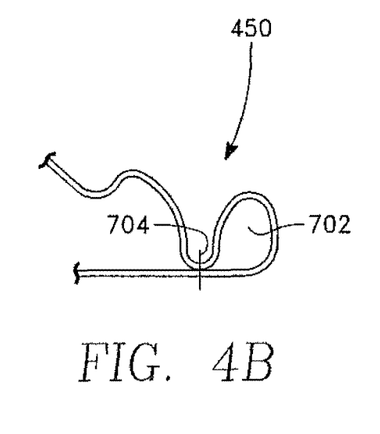
FIG. 4B is a section view perpendicular to cut plane 4B-4B of FIG. 4A, according to some embodiments of the invention.

FIG. 4A is a plan view of a second assembly task for an end guide, showing cut plane 4B-4B (section 4B-4B is depicted in FIG. 4B), according to some embodiments of the invention, and depicted as reference character 400. A flute 702 (the first flute in the apparatus) is created by lining up a first short line in the third section 206 with a first long line in the second section 204 and sewing (reference character 704). FIG. 4B is a section view perpendicular to cut plane 4B-4B of FIG. 4A, according to some embodiments of the invention, and depicted as reference character 450.

FIG. 5A is a plan view of a third assembly task for an end guide, showing cut plane 5B-5B (section 5B-5B is depicted in FIG. 5B), according to some embodiments of the invention. The third assembly task is depicted as reference character 500. Another flute is formed by lining up the first short line in the third section 206 with the first long line in the first section 202 and sewing (stitching) (reference character 704). FIG. 5B is a section view perpendicular to cut plane 5B-5B of FIG. 5A, according to some embodiments of the invention, and depicted as reference character 550.

Figure 6B:
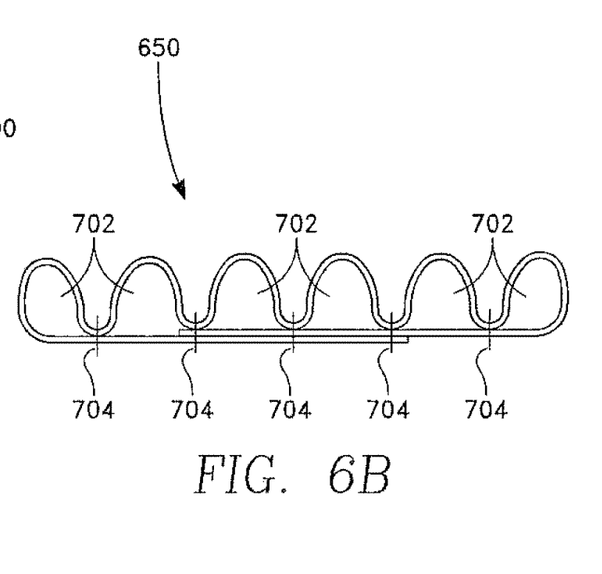
FIG. 6B is a section view perpendicular to cut plane 6B-6B of FIG. 6A, according to some embodiments of the invention.

FIG. 6A is a plan view of a fourth assembly task for an end guide, showing cut plane 6B-6B (section 6B-6B is depicted in FIG. 6B), according to some embodiments of the invention, and depicted as reference character 600. The two long sections 202 and 204 (from FIG. 2) are overlapped. Marks are lined up and four remaining flutes are formed by sewing short (third) section 206 to overlapped long (first and second) sections 202 and 204. The sewed stitches are depicted as reference character 704. FIG. 6B is a section view perpendicular to cut plane 6B-6B of FIG. 6A, according to some embodiments of the invention. Reference character 650 depicts the section view. The four interior flutes 702 in FIG. 6B are the "four remaining flutes" in this particular embodiment.

Figure 7B:
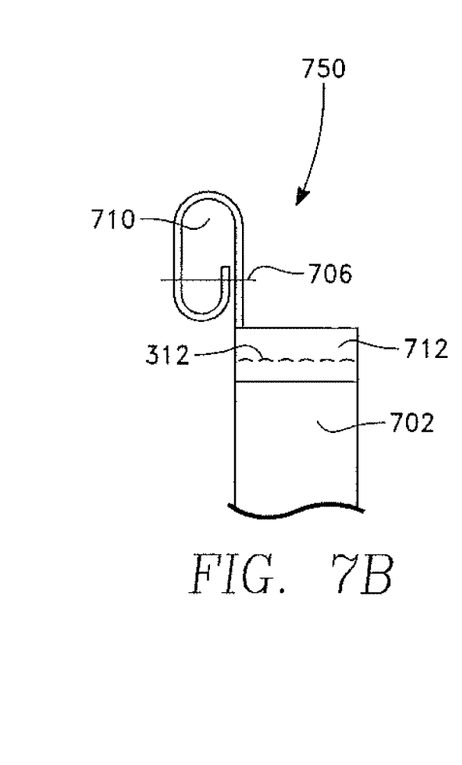
FIG. 7B is a section view perpendicular to cut plane 7B-7B of FIG. 7A, according to some embodiments of the invention.

FIG. 7A is a plan view of a fifth assembly task for an end guide, showing cut plane 7B-7B (section 7B-7B is depicted in FIG. 7B), according to some embodiments of the invention, and depicted as reference character 700. As discussed above, FIG. 7A may be considered a finished end guide. Reference character 720, is shown as a bold line, and depicts cloth overlap from the assembly tasks.

FIG. 7B is a section view perpendicular to cut plane 7B-7B of FIG. 7A, according to some embodiments of the invention, and depicted as reference character 750. An individual flute 702 is shown and an end channel 710 at the end of the end guide. Reference character 712 depicts a fold (hem) at the end of the flute 702 which acts to reinforce the cloth edge and prevent raveling.

FIG. 8 is a close-up plan view depicting the attachment of a cover and an end guide, according to some embodiments of the invention, and is depicted as reference character 800.

FIG. 9 is a plan view of a cord attachment device depicting a pair of end guides attached to a cover (shown with hidden lines) and attachment cords, according to some embodiments of the invention. The plan view is depicted as reference character 900.

Referring to FIGS. 2 through 8, one skilled in the art assembles an end guide by marking and cutting an H-shaped piece of cloth based on the pattern shown in FIG. 2. The H-shaped cloth is as described in detail above. The H-shaped cloth is folded longitudinally from its proximal end to its distal end to overlap each of the first and second sections. The user forms a plurality of flutes in the H-shaped cloth and stitches a plurality of first stitch lines. The first stitch lines are parallel to each other and extend through the first and second sides of the H-shaped cloth. As discussed above, the first stitch lines are located between each of the flutes. The user fashions the flutes so that they span to both the proximal and distal ends of the H-shaped cloth.

The first and second sections (202 and 204) are outwardly folded away from the plurality of flutes at both the proximal and distal ends and then stitched to themselves to form end channels. The stitching is perpendicular to the plurality of first stitch lines.

Several ways of creating the folds and stitching exist. Creating the folds and stitching in the appropriate locations and of the appropriate dimensions is application-specific. A user may annotate such as by marking or electronically recording locations to fold and stitch. The dashed lines 220 depicted in FIGS. 2, 3A, 4A, and 5A are annotations/markings used to assist a fabricator with folding and stitch placement to form the end guide 700 (FIG. 7). The dashed lines 220 may also be referred to as guide marks. The guide marks 220 are placed on the first (front) and second (back) sides of the H-shaped cloth 200 to locate fold lines. Guide marks on the second (back) side of the H-shaped cloth 200 coincide with the first and second 202 & 204 sections of the H-shaped cloth. Guide marks on the first (front) side coincide with the third section 206 of the H-shaped cloth 200.

Turning to FIG. 9, yet another way to assemble embodiments of the invention includes positioning the end guides 700 at a distance apart which represents the length of the cord attachment device 900. A fabricator cuts a length of cord sufficient to route through the end guides the number of times needed for the strength and length of the cord attachment device. A sufficient length at each end is left to perform a double finger trap of attachment cords, as well as account for any shrinkage in the attachment cords from the finger trap.

One having ordinary skill in the art will recognize that the finger trap technique is used to connect high strength, low elongation braided cords to other cords or to itself to form a loop. One way of making a finger trap includes inserting one end of the cord into the center of another cord (or itself to make a loop), and the end of the other cord is inserted into the center of the first cord. When a load is applied to the cord(s), the braid of the outer cord geometrically elongates, which causes it to collapse radially, applying sufficient friction to trap the inner cord. Typically, the ends of the cord are tapered inside to minimize stress risers where a single layer meets a double layer of cord.

A fabricator can then cut a length of attachment cord 906 sufficient to route through the end guides 700 the number of times needed for the requisite attachment strength and cord attachment device length and also while allowing a sufficient length at each end to perform a double finger trap, if desired, as well as accounting for any potential attachment cord shrinkage from the finger trap.

The fabricator may then route the attachment cording 906 through the first flute 702 on an end guide 700, and down to the first flute on the other end guide. The attachment cord routing then progresses to the second flute of the first end guide, down to the second flute of second end guide, and so forth. This process continues until the attachment cording is routed through the final flute of the second end guide.

The attachment cord ends 906 are brought together and finger traps on both ends are formed at cross over marks (the attachment cord overlaps 910). The finger traps are shown with the stitching 908 in the attachment cord 906. If desired, the concentric cover sleeve 100 is slid over the end guides (first and second end guides 700) and the attachment cording 906. Cover cord (depicted as reference character 804 in FIG. 8) is routed through the end channels of the cover 100 and end guide 700 at each end of the cover. The cover cord 804 is routed around the attachment cording 906, and through the end guides 700, end channel 710, and in the end (shown as cover loops 104 in FIGS. 1B and 1D) of the concentric cover sleeve 100 (when a concentric cover sleeve is used). The cover cords 804 are then attached to themselves. The attachment of the cover cords 804 to themselves is typically by knotting or finger traps but may also be by other adhesion methods such as, for example, glue or staples. When a cover is not used, the cord 804 may be routed through the end channels of an end guide and attached to itself, resulting in a keeper loop. One having ordinary skill in the art will recognize that a keeper loop is used to prevent motion. As such, a keeper loop can be used for preventing the end guide 700 from moving around an attachment point such as, for example, a pin, or for preventing the attachment cords that are routed through the end guide from moving away from the pin either along the pin axis and around the pin support or outward from the pin such that the attachment cords on either side of the pin move away from each other.

For a parachute riser end guide 700, a fabricator can assemble by routing a first suspension line 906 (or a suspension line extender for severed riser systems) through a first flute 702. A second suspension line 906 (or suspension line extender) is then routed through the second flute 702. The process continues until half of the suspension lines or extenders are routed through each of the flutes 702. The line ends are attached to a parachute or, if using extenders, to the appropriate suspension line. If desired, the concentric sleeve 100 is slid over the suspension lines/extenders and the end guide. Cover cord 804 is routed through the end channels 710 of the end guide 700, around the suspension lines/extenders and through the end channels in the bottom of the concentric sleeve 100, when used, with the cord knotted or finger trapped to itself.

In embodiments, the H-shaped cloth 200 is an ultrahigh molecular weight polyethylene. In other embodiments, the H-shaped cloth 200 is polytetrafluoroethylene. Stitches are made using para-aramid synthetic fibrous thread, however other thread materials may also be used without detracting from the merits or generality of embodiments of the invention. Other suitable thread materials include, but are not limited to, aliphatic polyamides (nylon), polyethylene terephthalate (PET) (commonly referred to as polyester), meta-aramids (Nomex®), and glass-fiber reinforced plastic (fiberglass).

Each of the flutes 702 is a channel configured to circumferentially envelop a discrete loading attachment cord. Each discrete loading attachment cord combines with other discrete loading attachment cords to form a plurality of attachment cords such as, for example, parachute lines or attachment slings. The flutes equalize loading of the attachment cords across all of the flutes and are configured to prevent cord migration of the attachment cords. In embodiments, the number of turns of attachment cord 906 is equal to the number of flutes 702 on the end guide 700.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for assembling an end guide, comprising:
cutting a cloth having first and second sides, first and second portions longer than a third portion, a proximal end, and a distal end, wherein said cloth is configured to fold over, unto, and overlap itself;
folding said cloth axially about a central longitudinal axis, said central longitudinal axis spanning from said proximal end to said distal end, wherein said folding causes said first and second portions to overlap;
forming a plurality of flutes in said cloth by stitching a plurality of first stitch lines, wherein each of said plurality of first stitch lines are parallel to each other and extend through said first and second sides of said cloth, wherein at least one of said plurality of first stitch lines is located between each of said flutes;
wherein said flutes span to both said proximal and said distal ends of said cloth; and
folding said first and second portions outwardly away from said plurality of flutes at both said proximal and distal ends and stitching said first and second portions to said cloth, wherein said stitching is perpendicular to said plurality of first stitch lines.

2. The end guide according to claim 1, wherein said cloth is an ultrahigh molecular weight polyethylene.

3. The method according to claim 1, wherein said cloth is polytetrafluoroethylene.

4. The method according to claim 1, wherein thread is used to form each of said stitches, said thread is selected from the group of thread materials consisting of para-aramid, aliphatic polyamide, polyethylene terephthalate, meta-aramid, and glass-fiber reinforced plastic.

5. The method according to claim 1, wherein each flute of said plurality of flutes is a channel configured to circumferentially envelop a discrete loading attachment cord, wherein each discrete loading attachment cord combines with other discrete loading attachment cords to form a plurality of loading attachment cords, wherein said plurality of flutes equalize loading of said plurality of loading attachment cords across all of said flutes and prevent cord migration of the loading attachment cords.

* * * * *